(12) United States Patent
Freiberg et al.

(10) Patent No.: US 8,908,534 B2
(45) Date of Patent: Dec. 9, 2014

(54) METHOD FOR PERFORMING LIFEBEAT MONITORING

(75) Inventors: Klaus Freiberg, Hördt (DE); Jürgen Laforsch, Karlsruhe (DE); Ingo Landgraf, Fürth-Poppenreuth (DE); Simone Thoneick, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 324 days.

(21) Appl. No.: 13/369,641

(22) Filed: Feb. 9, 2012

(65) Prior Publication Data

US 2012/0213087 A1    Aug. 23, 2012

(30) Foreign Application Priority Data

Feb. 9, 2011   (EP) ..................... 11153782

(51) Int. Cl.
  *H04L 12/26*   (2006.01)
  *H04L 29/08*   (2006.01)
  *H04L 29/06*   (2006.01)

(52) U.S. Cl.
  CPC .............. *H04L 67/14* (2013.01); *H04L 67/145* (2013.01); *H04L 69/28* (2013.01); *H04L 12/2678* (2013.01)
  USPC ...................................................... 370/241.1

(58) Field of Classification Search
  CPC ... H04L 67/14; H04L 67/145; H04L 12/2678; H04L 12/26; H04L 69/28; H04L 43/10
  USPC ........... 370/241–253; 709/227, 228, 235, 237
  See application file for complete search history.

(56) References Cited

U.S. PATENT DOCUMENTS

| | | | |
|---|---|---|---|
| 6,304,546 B1 | 10/2001 | Natarajan et al. | |
| 7,634,558 B1 | 12/2009 | Mangal et al. | |
| 2003/0187945 A1* | 10/2003 | Lubbers et al. | 709/213 |
| 2006/0020686 A1 | 1/2006 | Liss et al. | |
| 2007/0214256 A1* | 9/2007 | Castaneda et al. | 709/224 |
| 2008/0209068 A1 | 8/2008 | Herzog et al. | |
| 2009/0271517 A1 | 10/2009 | Naylor et al. | |

OTHER PUBLICATIONS

Donovan S., Rosenberg J., "The SIP Session Timer", Internet Engineering Task Force, Internet Draft, SIP WG, dynamicsoft, pp. 1-28, XP015028089, 2001, Oct. 6, 2001.

* cited by examiner

*Primary Examiner* — Ricky Ngo
*Assistant Examiner* — Wei-Po Kao
(74) *Attorney, Agent, or Firm* — Cozen O'Connor

(57) ABSTRACT

A method of lifeboat monitoring between a first and a second communication device, wherein a first monitoring request is received by the second communication device from the first communication device, where the first monitoring request to has a first monitoring time. In addition, a first reception time is determined by the second communication device based on the first monitoring time, lifeboat signals are received by the second communication device from the first communication device, and an interruption in the communication connection to the first communication device is triggered by the second communication device if, during the first reception time following receipt by the second communication device of the last lifeboat signal, a new lifeboat signal from the first communication device is unreceived by the second communication device.

12 Claims, 4 Drawing Sheets

METHOD FOR PERFORMING LIFEBEAT MONITORING

BACKGROUND OF THE INVENTION

1. Field of the Invention

The invention relates to a method of lifebeat monitoring between a first and a second communication device, a computer program product or a communication device that is configured to perform lifebeat monitoring for another communication device.

2. Description of the Related Art

In many communication processes in which two communication partners are in contact with each other, it is essential to establish whether the connection between the communication partners still exists or has been lost. Possible reasons for the interruption of a connection are, for example, the failure of one of the communication partners or a fault in the actual connection between the two communication partners.

In this connection, it is possible with, for example, the relevant International Standards Organization (ISO) protocol (e.g., ISO 8073) for communication partners to send each other lifebeats in the form of IDLE telegrams, which have to be answered by the communication partner. In other words, a first communication partner sends a corresponding lifebeat to the second communication partner who, following receipt of this lifebeat, confirms its receipt with a corresponding positive acknowledgement (ACK). In the event that the first communication partner does not receive a corresponding acknowledgement from the second communication partner, after a predefined time without acknowledgement, the first communication partner sends the IDLE telegram again and awaits, once again, an acknowledgement. After IDLE telegrams have been sent a predefined number of times without being acknowledged, an interruption in the connection is found to exist.

SUMMARY OF THE INVENTION

It is therefore an object of the present invention to provide an improved method of lifebeat monitoring, an improved computer program product and an improved communication device for the purposes of lifebeat monitoring.

This and other objects and advantages achieved in accordance with the invention by providing a method of lifebeat monitoring between a first and a second communication device is provided, where the method comprises the following steps performed by the second communication device: receipt of a first monitoring request from the first communication device, where it is possible for the first monitoring request to have a first monitoring time, determination of a first reception time based on the first monitoring time, receipt of lifebeat signals from the first communication device, triggering of an interruption in the connection to the first communication device if, during the first reception time following its receipt of the last lifebeat signal, the second communication device does not receive a new lifebeat signal from the first communication device.

In other words, "steady state" lifebeat telegrams are sent at set intervals by the first communication device and are checked by the second communication device at a set (other, greater) interval. Thus, in contrast to the prior art, lifebeat monitoring does not require the second communication device to send corresponding telegrams to the first communication device, with the lifebeat telegrams then having to be acknowledged by the first communication device. Instead, it is sufficient here for the second communication device to receive lifebeat telegrams (also known as lifebeat signals) from the first communication device, it being possible, based on a monitoring time defined by the first communication device, to define the interval, in the form of a first reception time, within which monitoring for the successful receipt of lifebeat telegrams by the second communication partner can occur.

In this connection, it should be noted that the first reception time can be determined based on the first monitoring time in various ways. One possibility, for example, is that the first communication device defines precisely how long the first reception time at the second communication device is to be, based on the first monitoring time. It is, however, also possible, at the second communication device, for a device-specific factor to be defined with which the first monitoring time received is multiplied such that the first reception time can be determined on this basis. A third alternative involves transmitting such a factor, together with the monitoring time, from the first communication device to the second communication device.

In all these cases, it is preferable for the first monitoring time to correspond to the time interval at which the lifebeat telegrams are transmitted from the first communication device to the second communication device. The first monitoring time corresponds to the transmission interval at which signals are transmitted by the first communication device, whereas the first reception time determined based on the first monitoring time corresponds to the reception time of the second communication device.

Monitoring Time

In one embodiment of the invention, the monitoring time is obtained from the product of the transmission interval and a factor, where it is possible for each of these values to have preferably a specific influence, such as the larger the factor, the better fluctuating delays along a route can be covered. In the case of data transfers via routes with pause times of several seconds the result can be that, with signals only being transmitted infrequently, a pause time can still result in an interruption in the connection if the factor is low.

The transmission time determines the load of the communication route. It is during this interval that telegrams must be sent. Also, the rasterization for the reaction, i.e., the shortest possible reaction time, can be obtained from the transmission time. The method is however independent of the delays of telegrams along the connection. It is possible for several lifebeats to be on the way from the first to the second communication partner (at intervals corresponding to the transmission interval) before the first lifebeat arrives at the second communication partner.

A general advantage of the disclosed embodiments of the present invention is that, for the purposes of lifebeat monitoring, no corresponding answer from the communication partner is needed after the lifebeat signal has been transmitted. This mechanism for monitoring connections is thus particularly suitable for communication routes with greater delays, for example, satellite connections. The sequence consisting of "sending the lifebeat telegram order and waiting for acknowledgement before a new order is sent" results in slower reaction times to interruptions in the connection because, as a result of the long signal delay, as long as all the time lifebeat telegrams are being received, the connection used for the purpose is considered to be in order. Monitoring by "order" and "acknowledgement", in which the next "order" is not sent until the "acknowledgement" has been received, therefore delivers lower quality of monitoring, as latency has to be taken into account. If, on the other hand, both sides are continuously sending lifebeat telegrams independently of one another, all forms of acknowledgement can be dispensed with, with the result that short reaction times to an interruption in the connection are assured even when signal delays are long.

It should be noted that the disclosed embodiments of the present invention can be applied to all types of communication connection underlying bus connection. In addition to the use of Transmission Control Protocol/Internet Protocol (TCP/IP), this includes User Datagram Protocol (UDP), Transport Layer Security (TLS) and all other types of transport protocols used in, for example, industrial standards, such as Profibus and PROFINET IO, CAN Bus and Mod Bus.

In accordance with an embodiment of the invention, upon receipt of the first monitoring request the second communication device informs the first communication device whether the communication connection from the first communication device to the second communication device is to be monitored. Thus, by sending the first monitoring request, the first communication device is enquiring of the second communication device whether it agrees to monitor the communication connection between the two communication devices.

If this is the case, the second communication device confirms the fact to the first communication device. If, following receipt of the first monitoring request, the second communication device states that it agrees to lifebeat monitoring, it will preferably send its own (second) monitoring time to the first communication device, optionally together with a monitoring request.

As in the disclosed embodiment of the method described above, this second monitoring time serves to cause the first communication device to interrupt the connection if, within a second reception time—determined based on the second monitoring time—following the second communication device's receipt of the last lifebeat signal, the first communication device receives no new lifebeat signal from the second communication device. In other words, the presently contemplated embodiment enables reciprocal monitoring of the communication connection between the two communication devices.

In accordance with another embodiment of the invention, the method involves the second communication device receiving a dynamically changed first monitoring time from the first communication device. Dynamic lifebeat monitoring between the first and the second communication devices, where the monitoring time is determined dynamically by the first communication device is thus made possible. For example, it is also possible here that the first communication device discovers that for a certain period it will not be able, due to a high system load, to continue to transmit lifebeat signals to the second communication device at the same intervals.

In order to prevent the second communication device from then triggering an interruption in the connection, the first communication device can thus dynamically change the first monitoring time, as a result of which the first reception time at the second communication device also changes. For example, the time intervals within which the first communication device must receive a new lifebeat signal following its receipt of the last lifebeat signal can be increased to prevent an interruption in the connection from being triggered. It should be appreciated that it is also possible for the first monitoring time to be shortened in line with the current system requirements.

In accordance with certain embodiments of the invention, the first monitoring time can even have the value "infinite". In this way, the first communication device instructs the second communication device to stop monitoring reception. However, the monitoring can be reactivated at any time through the subsequent transmission of a "reasonable" time. In accordance with another embodiment of the invention, the first reception time is independent of the signal delay for a transfer of data from the first communication device to the second communication device. This is because, as mentioned above, the lifebeat telegrams are sent at set intervals and monitored at other set intervals, and this "steady state" means that signal delay no longer matters.

In yet another embodiment of the invention, the second monitoring time is independent of the first monitoring time. This enables the first and the second communication devices independently to inform the other partner in each case of the extent to which lifebeat monitoring is to be performed by that partner.

The individual systemic status of each of the communication devices can then be taken into account. Both communication devices can dynamically change the lifebeat monitoring for this purpose.

In accordance with another embodiment of the invention, the method also involves the second communication device transmitting lifebeat signals to the first communication device, where it is possible, after the last lifebeat signal has been transmitted, for a new lifebeat signal to be transmitted within the second monitoring time. This means, in other words—as mentioned above—that a transmission interval is used for the second communication device with which the second communication device can transmit its lifebeat signals to the first communication device.

In a further embodiment, the term lifebeat signal, for example, refers to any kind of signal that is transmitted between the first and the second communication devices during the communication of payload data. This is because all the time second communication device data is being received by the first communication device, the second communication device can assume that an intact communication connection between the first and second communication devices exists, i.e., that there is no interruption in the connection. However, when no signals associated with payload data have been transmitted from the first communication device to the second communication device over a certain period of time at the latest, the first communication device transmits special signals to the second communication device, where it is possible for these special signals to be lifebeat signals, i.e., signals that are transmitted specifically for the purpose of indicating a lifebeat. In this case, such a lifebeat signal is, for example, emitted by a data packet specifically identified as "lifebeat".

In this connection, the first communication device can, for example, establish whether a new payload data signal can be transmitted to the second communication device within its predetermined transmission time following transmission of the last payload data signal. It is particularly when such data transmission is not expected that the first communication device transmits a special lifebeat signal to the second communication device.

As mentioned above, the disclosed embodiments of the invention enable the first monitoring time to be dynamically changed. For this to be possible, the first monitoring device must accordingly transmit the first monitoring time to the second communication device. This can, for example, be performed such that the first monitoring time currently in use is transmitted simultaneously with the transmission of the "special" lifebeat signals. However, provided this is possible, the option also exists of transmitting the first monitoring time while communicating the payload data from the first communication device to the second communication device. To this end, the first monitoring time currently in use can, for example, be included in the data header.

In accordance with another embodiment of the invention, lifebeat monitoring between the first and the second communication devices occurs via a first communication channel, where it is also possible to connect the second communication device to the first communication device simultaneously via a second communication channel and, in the event that the second communication device triggers the interruption of the connection, for the second communication device to break off communication via the first communication channel, with communication being continued via the second communication channel.

In other words, the two communication devices are connected to one another via two "underlying connections". As soon as an interruption in one of the underlying connections that have been set up is triggered, communication is continued immediately thereafter via the second underlying connection.

These two underlying connections can of course be monitored independently of one another by the two communication partners, using the method of lifebeat monitoring in accordance with the disclosed embodiments of the invention, where it is possible for each underlying connection to be monitored at different intervals. It should be pointed out that it is always possible for a communication partner to monitor any number of communication connections having different monitoring times. In the same way, it is also possible to monitor communication connections with more than one partner, each with different monitoring times.

It is also an object of the invention to provide a computer program product including instructions, executable by a processor, for implementing the disclosed embodiments of method in accordance with the invention.

It is also an object of the invention to provide a communication device, where it is possible for the communication device to be configured to perform lifebeat monitoring for another communication device and for the communication device to be configured to perform the following steps of receiving a first monitoring request from the other communication device, where it is possible for the first monitoring request to have a first monitoring time, determining a first reception time on the basis of the first monitoring time, receiving lifebeat signals from the other communication device, and triggering an interruption in the connection to the other communication device if, during the first reception time following its receipt of the latest lifebeat signal, it does not receive a new lifebeat signal from the other communication device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the invention are described in more detail below with the aid of drawings in which.

DETAILED DESCRIPTION OF THE PREFERRED EMBODIMENTS

Figure 1:
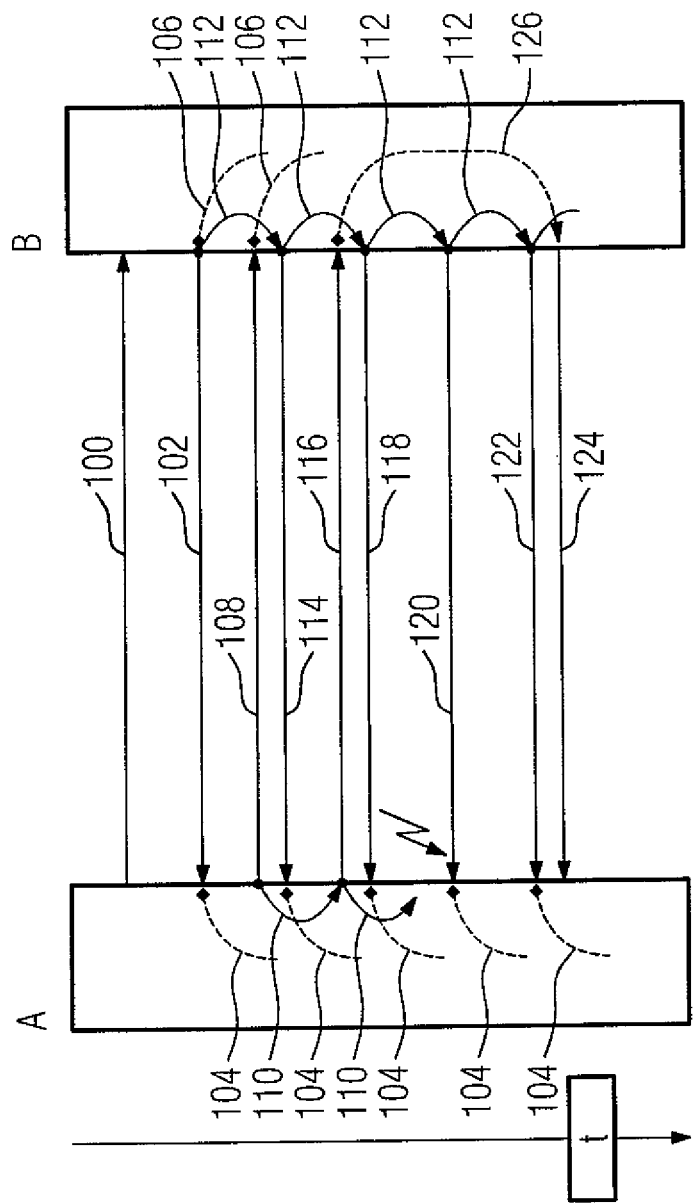
FIG. 1 shows lifebeat monitoring with detection of an interruption.

FIG. 1 shows steps in a method of lifebeat monitoring between a first and a second communication device, referred to below as "communication devices" or the equivalent, "communication partners," A and B. The following description refers to any kind of communication connection via which A and B are connected to one another.

In step 100, an underlying connection comprising a monitoring request is set up to run between communication partner A and communication partner B. In step 102, communication partner B acknowledges that the underlying connection comprising a monitoring request has been set up. In both step 100 and step 102, a monitoring time from A to B, or from B to A, is transmitted. In the following it should be assumed, without loss of generality, that the monitoring time is the time that determines the transmission intervals for A or B independently of one another.

The partner in each case can then, based on this received monitoring time, determine the reception time following receipt of the last lifebeat signal within which a new lifebeat signal must be received from the other communication partner to prevent an interruption in the connection from being triggered.

Each of the dotted lines in communication partners A and B in FIG. 1, i.e., the lines 104 and 106, depicts the reception timer that runs along the vertical time axis t. The solid lines 110 and 112, on the other hand, depict the respective transmission timers of the communication partners A and B, i.e., the interval within which lifebeats are transmitted to the other partner in each case.

In step 100, a first monitoring time was transmitted from A to B, and in step 102 a second monitoring time was transmitted from B to A. In the present embodiment, the first monitoring time indicates the part with which communication partner A transmits its lifebeat to communication partner B. In a similar way, the second monitoring time indicates the interval at which communication partner B transmits its lifebeat to communication partner A. The two associated transmission timers 110 and 112 used must not be identical.

It is also possible for the communication partners to determine, based on the basis of the first and second monitoring times, the times following receipt of the last lifebeat signal within which a new lifebeat signal must be received from the communication partner opposite, in order to prevent an interruption in the connection from being triggered. For example, it is thus possible, based on the first monitoring time transmitted in step 100, for communication partner B to determine the first reception time within which it can expect the next lifebeat signal from partner A.

When communication receives acknowledgement of communication partner A the setting up of the underlying connection in step 102, communication partner A interprets this as the first lifebeat of B, whereupon the reception timer 104 in communication partner A is triggered. As far as communication partner B is concerned, it is, for example, possible for the first transmission timer of all, 106, to be triggered by the sending of the acknowledgement in step 102.

In step 108 communication partner A transmits a first lifebeat signal to partner B, and this lifebeat signal arrives at partner B at a time at which the reception timer 106 has not yet expired. However, the receipt of this lifebeat immediately triggers a restart of the reception timer, and communication partner B continues to expect that the next lifebeat signal from communication partner A will be received before this next reception timer 106 expires.

Independently of the lifebeat signal being received in step 108, communication partner B transmits its own lifebeat signal to communication partner A in step 114, as the corresponding transmission timer 112 in communication partner B has expired. This lifebeat signal in step 114 arrives at communication partner A at a time at which the reception timer 104 has not yet expired. However, this triggers a restart of the reception timer 104 in communication partner A as soon as the lifebeat signal in step 114 is received.

Again, independently of the lifebeat signal being received in step 114, communication partner A transmits another lifebeat signal to partner B in step 116, as the corresponding transmission timer in communication partner A expires at this particular time. The transmission timer was triggered with the transmission of the last lifebeat signal in step 108. In reaction to this, that is to the receipt of this lifebeat signal in step 116, the corresponding reception timer 126 in communication partner B is triggered to restart—and the lifebeat signal in step 116 reaches communication partner B before the previous reception timer 106 expires, with the result that no interruption of the connection is triggered in this case, either.

Again, independently, communication partner B transmits its own lifebeat to partner A in step 118, as the corresponding transmission timer 112 in communication partner B expired after the last lifebeat signal was transmitted in step 114. This lifebeat from step 118 is received by communication partner A, as a result of which the corresponding reception timer 104 in partner A is triggered.

It is assumed in the following that the connection between communication partners A and B has been interrupted: The transmission of the last lifebeat signal by communication partner A in step 116 triggered the corresponding transmission timer 110. However, as can be seen, this transmission timer 110 is about to expire without a new lifebeat signal having been transmitted from communication partner A to communication partner B, but as transmission of the lifebeat from communication partner B to communication partner A does not depend upon the lifebeat being received by communication partner B, B accordingly continues, in steps 120 and 122, to transmit its lifebeat to communication partner A in accordance with its own expiring transmission timers 112. This can trigger corresponding reception timers 104 in communication partner A, although this is only possible if communication partner A can receive data from communication partner B at all, would like to receive data from communication partner B and/or is even capable of processing the data received. What is crucial with regard to FIG. 1, however, is that communication partner A transmits no further lifebeats to communication partner B, with the result that in step 126 the reception timer triggered in step 116 expires, which in turn results, in step 24, in communication partner B interrupting the underlying connection.

In other words, communication partner B thus triggers an interruption in the connection because no further lifebeat signal was received by communication partner A within the reception time following reception of the last lifebeat signal in step 116.

Figure 2:
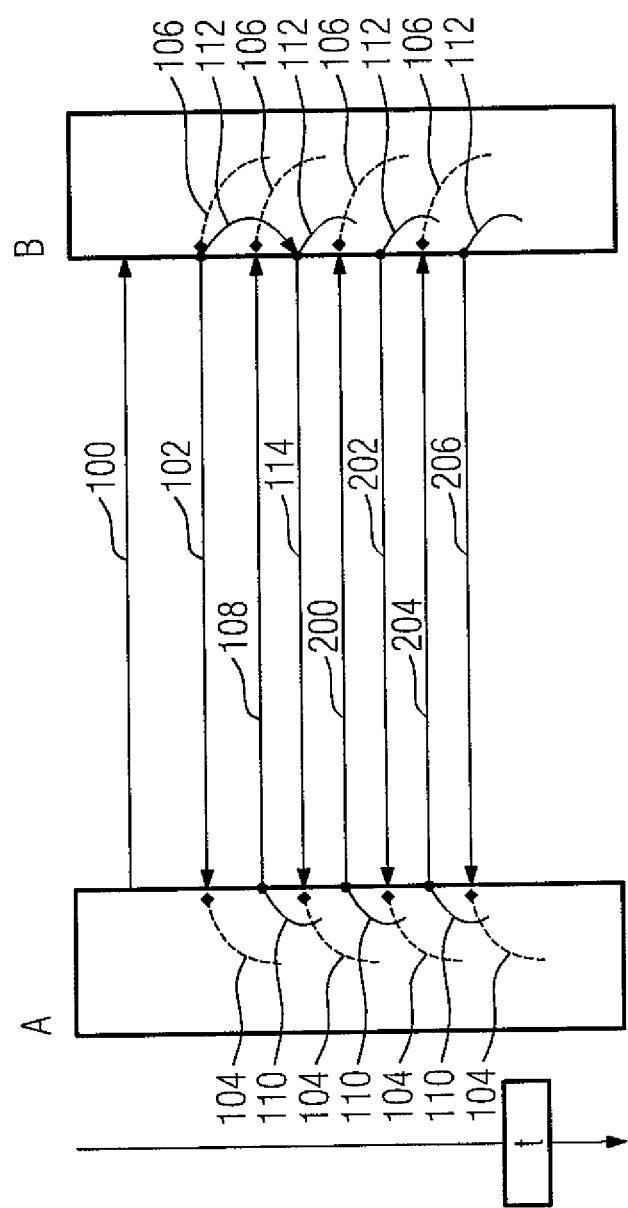
FIG. 2 shows lifebeat monitoring during live operation.

FIG. 2 shows an example of lifebeat monitoring in live operation. Live operation should be understood as meaning the transmission of signals during the communication of payload data between communication partners A and B. These signals are therefore not special lifebeat signals but simply the data packets that occur anyway during the transfer of payload data.

Steps 100, 102, 108 and 114 are identical to the steps in FIG. 1 that are identified by the same reference numbers. This means that in step 100, an underlying connection comprising a monitoring request is set up between communication partners A and B that is acknowledged by communication partner B in step 102. A first lifebeat is then transmitted from communication partner A to communication partner B in step 108, and a lifebeat is transmitted from communication partner B to communication partner A in step 114. Again, following receipt of the lifebeat in step 108, the corresponding reception timer 106 is triggered in communication partner B but does not expire because payload data is received by communication partner B in step 200.

The transmission, in step 108, of the last lifebeat sent by communication partner A, also triggered the corresponding transmission timer 110. Unlike in the embodiment shown in FIG. 1, however, this transmission timer does not expire but is restarted in step 200, as communication partner A sends payload data to communication partner B. And again, the payload data received by communication partner B in step 200 triggers the restart of the corresponding reception timer 106 in communication partner B.

The underlying connection is thus set up as exemplified in FIG. 1, but live operation starts on both sides in due course—i.e., as frequently or fast as is necessary for the lifebeat monitoring timers not to expire but simply to be continually triggered to restart. No additional lifebeat is then needed for the purposes of lifebeat monitoring, and normal live operation is sufficient for the purposes of failure detection.

Thus, when the lifebeat is transmitted by communication partner B in step 114 the corresponding transmission timer in communication partner B is also triggered and also does not expire, as payload data is transferred from communication partner B to communication partner A in step 202. The transmission timer in communication partner B is therefore not reset in step 202. This payload data sent in step 202 is received by communication partner A and this causes the reception timer 104 triggered in step 114 to be reset and, as a result, restarted.

Even before transmission timer 110 has expired, communication partner A in turn sends payload data to communication partner B (step 204), as a result of which transmission timer 110 is triggered to restart. In a similar way, B sends payload data to communication partner A in step 206—before the corresponding transmission timer 112 has expired.

Figure 3:
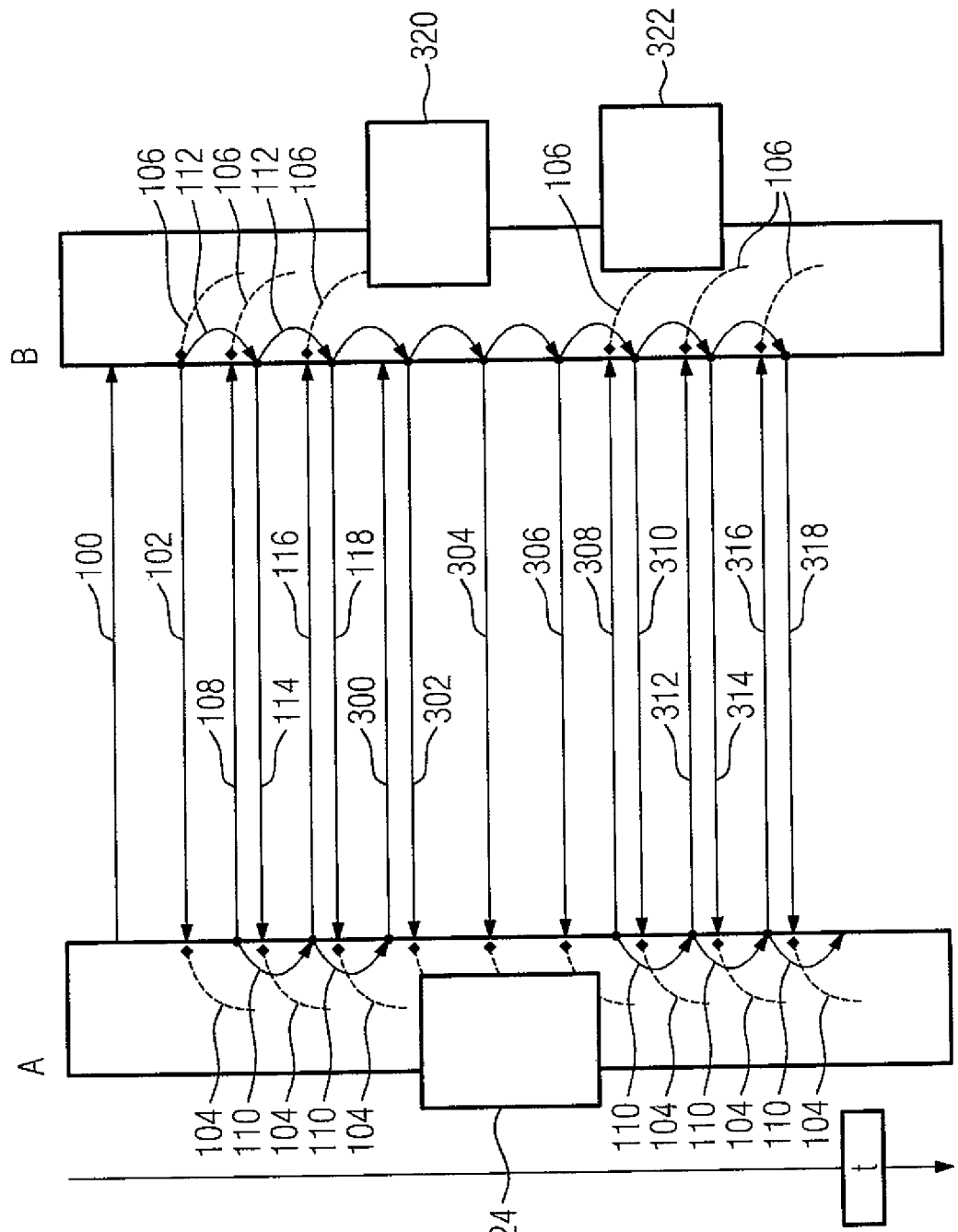
FIG. 3 shows lifebeat monitoring that is not during live operation.

FIG. 3 shows an example of a method of lifebeat monitoring that is not during live operation. This involves, first of all, lifebeat monitoring between communication partner A and communication partner B in steps 100, 102, 108, 114, 116 and 118 in the same way as in the corresponding steps already described with reference to FIG. 1.

After the last lifebeat has been transmitted from communication partner A to communication partner B in step 116, in step 300, communication partner A sends a new lifebeat to communication partner B, after transmission timer 110 has expired. However, when transmitting the lifebeat, communication partner A also sends communication partner B a dynamically changed monitoring time, i.e., the monitoring time "infinite", as communication partner A is unable to send lifebeats for a short time due, for example, to internal procedures, and communication partner B, who does not know the internal procedures of communication partner A, should not interrupt the connection during this period. This results, in step 320, in the corresponding reception timer 106 in communication partner B also being set to "infinite" following receipt of lifebeat 300, with the result that this reception timer is no longer able to expire.

Communication partner B continues to send lifebeats to communication partner A in steps 302 to 306, but communication partner A is free to choose whether or not to monitor said reception (step 324).

Shortly before step 308 is executed, communication partner A is in normal operating mode, in which it would like to be monitored by communication partner B. Therefore, in step 308, communication partner A again transmits a "reasonable" monitoring time to communication partner B. This can either be a new time value or the original value used before the time was set to "infinite". Thus, in step 308, communication partner A again transmits the changed monitoring time to communication partner B, as well as a lifebeat, with the result that from then on, in step 322, communication partner B in turn monitors reception of the lifebeat.

The lifebeat sent from communication partner B to communication partner A in step 310 is received by communication partner A and triggers there the reception timer 104 in communication partner A. In step 312, the transmission timer in communication partner A has expired and communication partner A transmits a lifebeat to communication partner B in the usual way, this lifebeat being received by communication partner B before the reception timer 106 in communication partner B has expired. The process is continued in the similar steps 314 to 318.

Figure 4:
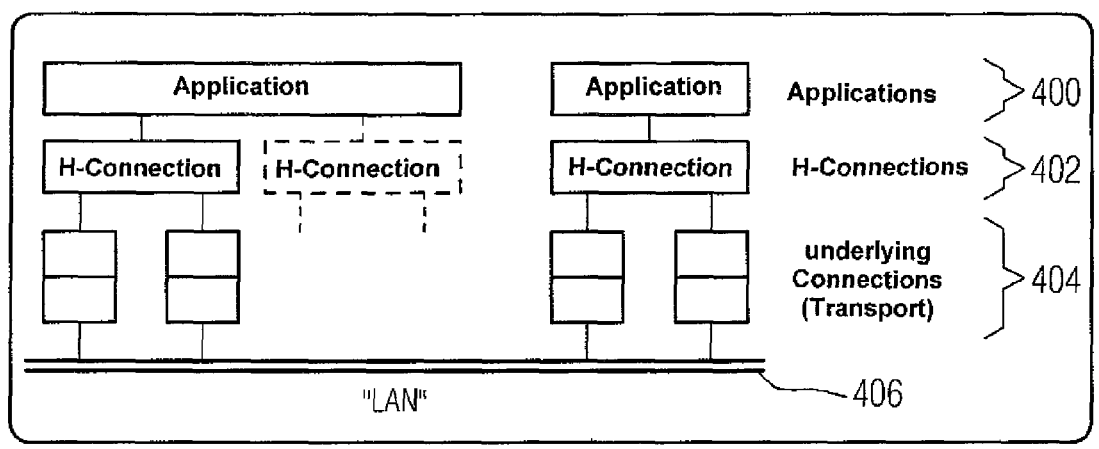
FIG. 4 shows an H connection with several underlying connections.

FIG. 4 shows an example of an H connection (highly available connection) with underlying sub-connections. This concept is based on the idea of allocating one or more H connections 402 to each application 400, it being possible, in turn, for each H connection 402 to have at least two underlying transport connections, such as communication channels 404. In principle, the application 400 can communicate with any other application using the H connections 402, but without having to know how many of the H connections 402 used have underlying sub-connections.

It is now possible for several applications to communicate with one another via the LAN connection 406 shown in FIG. 4. If one expands this basic concept to include so-called H systems, i.e., systems which have both a synchronized master CPU and a reserve CPU, and which are connected to one another via H connections and underlying transport connections, another possible application for the method described above becomes apparent.

The time required by the H system to achieve redundant operation of master and reserve CPU is called the "connecting and updating time". It is during this connecting and updating time that the reserve obtains all data, statuses, buffers and connections from the master, in order to have the same processing status as the master. However, for this purpose, communication between master and reserve CPU must be temporarily halted, but without the connections being interrupted.

Connection monitoring by means of PING telegrams would in this case not function while communication is halted, as this period is longer than the "normal" monitoring times and, as a result, no lifebeat could be sent. The communication partner, who does not know that the other partner is in the process of connecting and updating, would therefore interrupt the connection due to the absence of a lifebeat.

If, on the other hand, any one of the above disclosed embodiments of the method described above is used, then when the connection is set up between the two CPUs, they "negotiate" whether these connections are to be monitored or not. If monitoring is desired, each of the H connection's underlying connections is used for this monitoring, which would then occur as follows: each side sends telegrams during at least one interval x (either because live operation is transmitted or a lifebeat telegram is sent instead), and expects to receive telegrams in at least one interval y, with y being, for example, ≥2·x. If no telegrams are received in interval y, this underlying connection is interrupted and communication continued on another underlying connection. The monitoring intervals of the individual underlying connections can vary.

During connecting and updating, it is possible to instruct the communication partner to execute changed reception monitoring by sending them a dynamically changed lifebeat monitoring time. Again, it is possible, for example, to transmit "infinite" as the special time, which deactivates reception monitoring by the communication partner without the underlying connection having to be interrupted and set up again. The connecting and updating is executed, after which a "reasonable" time, i.e., a time shorter than infinite, can be transmitted to the communication partner, thus reactivating monitoring.

By using a "round robin" method for the payload data, for example, it is possible to reduce the number of lifebeat telegrams if communication occurs more frequently than lifebeat monitoring, i.e., the protocol traffic, with the payload data, replaces the sending of special lifebeat telegrams (as discussed above, payload data corresponds to the lifebeat). If the payload data sent is distributed among the individual underlying connections of the H connection it is also possible to distribute the communication load.

The above described embodiments of the method in accordance with the invention thus exhibit the following advantages: they offers the possibility of "end to end" lifebeat monitoring across routers and gateways, which means it is immaterial what kind of bus physics or protocols lie between the end points—the lifebeat monitoring is from communication end point to communication end point. Also, the monitoring is dynamic and can be adapted to the current situation of the individual communication partners during the lifetime of the connection. This means that if one's own current situation does not permit monitoring, one's communication partner is informed of that fact and must adapt their monitoring accordingly. When strict monitoring is once again possible, the time can be adjusted again without the connection having to be interrupted.

Each lifebeat telegram is sent together with information as to when the next lifebeat will be transmitted, if at all, which means that the transmission interval can be changed straight away. Also, each communication partner decides locally at what intervals they will send lifebeat telegrams. It is also possible for each communication partner to detect the failure of an underlying connection locally, to interrupt the underlying connection locally and to either set up a new connection or to switch to a standby connection.

As already mentioned, the monitoring times for each underlying connection can be set individually. Thus, for example, an H connection can use underlying connections with different latency times (delays), including lifebeat monitoring of the kind that would be useful for a satellite connection, for example. In the steady state, there is no differentiation between the mechanisms for analyzing lifebeat monitoring because a lifebeat telegram is always sent after the time x and received after the time y (regardless of the latency time (delay)), if live operation is not present. This method also works if the latency time (delay) for the transfer of data is longer, as is the case with a satellite connection. The start phase can also be monitored, by dynamic updating of the monitoring time.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of lifebeat monitoring between a first and a second communication device, the method comprising:
   receiving, by the second communication device, a first monitoring request from the first communication device, the first monitoring request having a first monitoring time;
   determining, by the second communication device, a first reception time based on the first monitoring time;
   receiving, by the second communication device, lifebeat signals from the first communication device; and
   triggering, by the second communication device, an interruption in a communication connection to the first communication device if a new lifebeat signal from the first communication device is not received by the second communication device during the first reception time following receipt by the second communication device of a latest lifebeat signal;
   wherein, following receipt of the monitoring request, the second communication device states whether it agrees to lifebeat monitoring; and
   wherein, if the second communication device agrees, the second communication device sends a second monitoring time to the first communication device, the second monitoring time enabling the first communication device to interrupt the communication connection if the first communication device receives no new lifebeat signal from the second communication device within a second reception time, determined based on the second monitoring time, following receipt of the last lifebeat signal by the second communication device.

2. The method as claimed in claim 1, wherein, upon receipt of the first monitoring request, the second communication device informs the first communication device whether the communication connection between the first and the second communication devices is to be monitored.

3. The method as claimed in claim 1, further comprising:
   receiving a dynamically changed first monitoring time from the first communication device by the second communication device.

4. The method as claimed in claim 3, wherein the lifebeat signals have the dynamically changed first monitoring time.

5. The method as claimed in claim 1, wherein the first monitoring time can have the value "infinite".

6. The method as claimed in claim 1, wherein the first reception time is independent of a signal delay for a transfer of data from the first communication device to the second communication device.

7. The method as claimed in claim 1, wherein the second monitoring time is independent of the first monitoring time.

8. The method as claimed in claim 1, further comprising:
   transmitting the lifebeat signals by the second communication device to the first communication device;
   wherein, after the last lifebeat signal is transmitted, a new lifebeat signal is transmittable within the second monitoring time.

9. The method as claimed in claim 1, wherein a lifebeat signal includes one of any kind of signal that is transmitted between the first and the second communication devices during communication of payload data, and a signal that is transmitted specially for the purpose of indicating a lifebeat.

10. The method as claimed in claim 1, wherein lifebeat monitoring between the first and the second communication devices occurs via a first communication channel, wherein the second communication device is connectable to the first communication device simultaneously via a second communication channel; and
   wherein, in an event that the second communication device triggers the interruption of the connection, the second communication device breaks off communication via the first communication channel, with communication being continued via the second communication channel.

11. A computer program product stored in non-transitory a computer memory and executing on a processor, which when used on a computer apparatus, causes the processor to perform lifebeat monitoring between a first and a second communication device, the computer program comprising:
   program code for receiving, by the second communication device, a first monitoring request from the first communication device, the first monitoring request having a first monitoring time;
   program code for determining, by the second communication device, a first reception time based on the first monitoring time;
   program code for receiving, by the second communication device, lifebeat signals from the first communication device; and
   program code for triggering, by the second communication device, an interruption in a communication connection to the first communication device if a new lifebeat signal from the first communication device is not received by the second communication device during the first reception time following receipt by the second communication device of a latest lifebeat signal;
   wherein, following receipt of the monitoring request, the second communication device states whether it agrees to lifebeat monitoring; and
   wherein, if the second communication device agrees, the second communication device sends a second monitoring time to the first communication device, the second monitoring time enabling the first communication device to interrupt the communication connection if the first communication device receives no new lifebeat signal from the second communication device within a second reception time, determined based on the second monitoring time, following receipt of the last lifebeat signal by the second communication device.

12. A communication device configurable to perform lifebeat monitoring for another communication device and to:
   receive a first monitoring request from the other communication device, the first monitoring request having a first monitoring time;
   determine a first reception time based on the first monitoring time;

receive lifebeat signals from the other communication device; and trigger an interruption in a communication connection to the other communication device if a new lifebeat signal from the first communication device is not received by the second communication device during the first reception time following receipt by the communication device of a latest lifebeat signal;

wherein, following receipt of the monitoring request, an agreement that the other communication device indicates it agrees to lifebeat monitoring is received from the other communication device; and wherein, if the other communication device agrees, the communication device receives a second monitoring time sent from the other communication device, the second monitoring time enabling the communication device to interrupt the communication connection if no new lifebeat signal is received from the other communication device within a second reception time, determined based on the second monitoring time, following receipt of the last lifebeat signal by the other communication device.

* * * * *